United States Patent

Bulgrin et al.

[11] Patent Number: 6,042,336
[45] Date of Patent: Mar. 28, 2000

[54] OFFSET CENTER OF GRAVITY RADIAL DAMPER

[75] Inventors: Charles A. Bulgrin, Palm City; John O. Struthers, Palm Beach Gardens, both of Fla.

[73] Assignee: United Technologies Corporation, Hartford, Conn.

[21] Appl. No.: 09/199,615

[22] Filed: Nov. 25, 1998

[51] Int. Cl.⁷ ...................................................... B63H 1/00
[52] U.S. Cl. ................. 416/145; 416/193 A; 416/219 R; 416/220 R; 416/248; 416/500
[58] Field of Search ............................... 416/145, 193 A, 416/219 R, 220 R, 248, 500

[56] References Cited

U.S. PATENT DOCUMENTS

| | | | |
|---|---|---|---|
| 3,666,376 | 5/1972 | Damlis | 416/219 |
| 3,751,183 | 8/1973 | Nichols et al. | 416/220 |
| 3,841,792 | 10/1974 | Amos | 415/172 |
| 4,101,245 | 7/1978 | Hess et al. | 416/190 |
| 4,182,598 | 1/1980 | Nelson | 416/193 A |
| 5,143,517 | 9/1992 | Vermont | 416/190 |
| 5,201,849 | 4/1993 | Chambers et al. | 416/95 |

*Primary Examiner*—Edward K Look
*Assistant Examiner*—Matthew T. Shanley
*Attorney, Agent, or Firm*—Norman Friedland

[57] ABSTRACT

A damper for the blades of a turbine rotor for attenuating the vibrations excited in a radial direction by configuring the damper to have at least two legs bearing against the blade and the disc supporting the blade for grounding the radial vibrations transmitted radially through the damper and offsetting the center of gravity of the damper from the point of contact with the blade.

9 Claims, 2 Drawing Sheets

OFFSET CENTER OF GRAVITY RADIAL DAMPER

This invention was made under a government contract and the United States Government has an interest herein.

TECHNICAL FIELD

This invention relates to dampers for rotating machinery and particularly to dampers for the blades in the turbo-pump for a rocket engine or turbine blades in a gas turbine engine with the damper being configured with the center of gravity being offset from the point of contact and the frictional resistance is created to act between the blade and ground to damp the vibrations occurring in the radial directions.

BACKGROUND OF THE INVENTION

As one skilled in the field of aeronautical technology appreciates, it is conventional to provide dampers, particularly for the blades in a turbine rotor of a turbo-pump for rocket engines or the turbine blades of a jet engine, that serve to attenuate the high vibration occasioned by the hostile environment to which this hardware is subjected. Typically, one of the more conventional methods of damping is to have the damper made to provide damping from blade to blade. However, the problem with a blade-to-blade damper is that the damping can only be tuned to just a few specific modes of vibratory motion and does not attenuate vibratory motion in other modes. In the blade-to-blade dampers the frictional resistance is created between blades whereas the type of damper that is the subject matter of this invention the frictional resistance is created between the blade and ground as will be detailed in the description to follow. Other dampers utilized in the aeronautical field are dampers that serve to create the frictional resistance between blades and the disc supporting the blades, which is essentially a blade to ground damper. In these types of dampers the damping occurs between blade and hardware that is grounded in the system. Typically this method of damping is primarily concerned with vibrations occurring in the axial and circumferential direction.

Examples of blade-to-blade damping is described in U.S. Pat. No. 4,872,810 granted to Brown et al on Oct. 10, 1989 entitled "Turbine Rotor Retention System" and commonly assigned to United Technologies corporation. An example of damping that is created between the blade and disc or blade to ground damping is in U.S. Pat. No. 5,205,713 granted to Szpunar et al on Apr. 27, 1993 entitled "Fan Blade Damper" which discloses a damper where the damper is reacted against the platform of the blade and transmitted to the turbine disk where the damper is mounted in a statically determinant fashion. In another type of damper the center of gravity is offset from the point of contact and this type of damper is exemplified by U.S. Pat. No. 5,052,890 granted to Roberts on Oct. 1, 1991 and entitled Device For Damping Vibrations in Turbo machinery Blades. All of these aforementioned patents are of the type that react the vibratory motion from blade-to-blade or blade-to-disc notwithstanding that the damper acts on the platform of the blade and the reaction may be in the disc and in all of these systems the damping occurs in a circumferential and/or axial direction.

The problem that needed to be solved by this invention is where the vibratory motions that are encountered in the turbo-pump of a rocket engine or the turbine of a gas turbine engine pumps, etc. where there are many sources of cyclic or periodic loads on individual components of the system and the loads needed to be damped are in the radial direction.

The rotating turbine blades are subject to vibratory excitations caused by these oscillating loads. These vibratory excitations induce a dynamic stress in addition to the steady stress in the blade which can cause fatigue cracking and eventual catastrophic failure of a blade. The dampers serve to generate friction during the motion of the blade and damper which generates heat and dissipates the energy created by the vibratory motion with a consequential reduction in lower cyclic stress. In other words and in accordance with this invention the damping lessens the amplitude of motions in the radial direction during the vibratory excitation so the designers of rotating machinery utilize this damping technique to avoid high cycle fatigue.

It is customary to provide a mass or small piece of hardware against two adjacent blades or blade and disc and rely on the centrifugal force of the rotating machinery to press the hardware against the working surface of the blade/blade or blade/disc. As one skilled in this art knows, this type of blade/blade or blade/disc damper is satisfactory where it is desired to attenuate the vibrations in a circumferential direction and/or axial direction. Unfortunately, these types of dampers referred to in the immediate above paragraphs do not damp in the radial direction and hence, the vibratory motion incidental to radial loads are not attenuated.

In experimental testing of the fuel pump used in rocket engines, it was found that cracking and eventual failure of turbine blades had been experienced when utilizing the heretofore known types of dampers, i.e. the blade-to-blade dampers.

We have found that we can obviate this problem by providing a damper that resists the radial motion and achieves a blade-to-ground damping rather than the blade-to-blade damping. The damper which is a small mass or metallic hardware that is geometrically and judiciously configured to fit into a radial recess or slot formed in the surrounding hardware and the center of gravity of the damper is offset relative to the point of contact that the damper makes with the adjacent part, be it the blade or blade platform. The slot is formed in either in the disc or blade. During high rotational velocity of the rotating machinery the damper of the present invention is forced radially outwardly to press against the turbine blade. The reaction forces induced against the side wall in the slot serve to attenuate the vibration occurring in the radial direction. It will be noted that although these dampers of this invention are efficacious for damping vibratory motion in the radial direction, the use of other dampers for treating vibratory motions in other directions are not precluded.

SUMMARY OF THE INVENTION

An object of this invention is to provide an improved damper that attenuates vibrations occurring in the radial direction and the damper is configured to transmit the loads from the blades to ground.

A feature of this invention is that the damper is free fitting in a void in the structure and oriented to act between the platform of the blades and disc supporting the blades.

A feature of this invention is the inclusion of the damper between the adjacent platforms of adjacent blades mounted in the disc supporting a two-stage turbine rotor.

Another feature of this invention is the provision to a fir tree slot formed in the disc for supporting the turbine blades of a two stage rotor and inserting a free moving damper between one of the blades and the interstage blade spacer supported to the disc.

The foregoing and other features of the present invention will become more apparent from the following description and accompanying drawings.

DETAILED DESCRIPTION OF THE INVENTION

Figure 2:
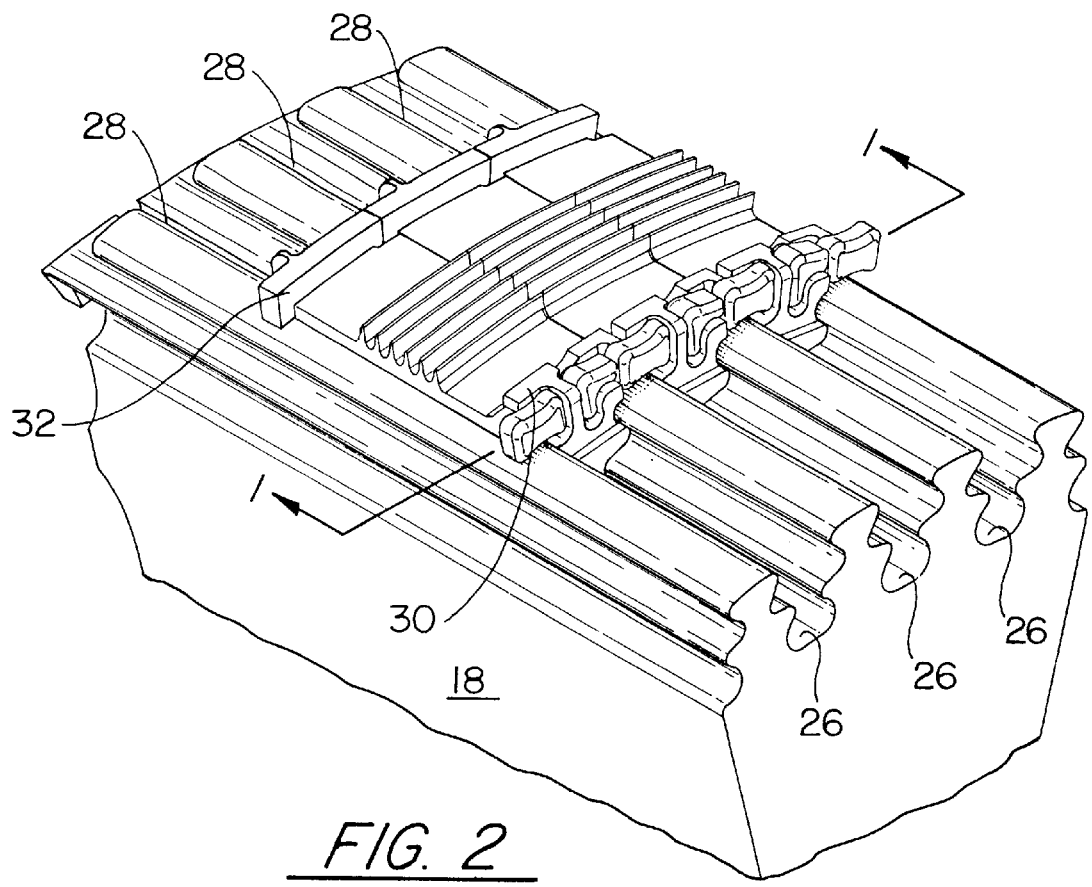
FIG. 2 is a partial view in perspective showing a typical circumferential and axial damper, an interstage blade spacer and the damper of this invention mounted in the disk of the two-stage turbine rotor.

While preferred embodiment of this invention is being described in a two-stage turbine rotor in a turbopump for rocket engines, it is to be understood that this invention has utility for other types of rotary machinery and for example, in the turbine or compressor blade/disc of the turbine and/or compressor rotor of a gas turbine engine. It being understood that this invention is particularly efficacious in rotary machinery where it is desirable to dampen radial loads impacted on the rotary hardware of such rotary machinery.

For an understanding of this invention reference is made to FIGS. 1 through 4 illustrating one of the embodiment where the invention is particularly efficacious which is the turbine section generally illustrated as reference numeral 10 in a turbo pump for a rocket engine (not shown). The turbine section consist of a two-stage turbine 12 including a pair of a plurality of circumferential spaced turbine blades 14 and 16 supported to the turbine disk 18. The flow of the working medium is first between the turbine blades 14, through the space between the plurality of circumferentially spaced stator vanes 20 and then between the turbine blades 16. These turbine blades are of the axial flow types that accept high temperature working medium in a manner to extract the energy therefrom to power the pumps (not shown). An interstage spacer generally indicated by reference numeral 22 is disposed between the turbine blades 14 and 16. Interstage spacer 22 comprises a segmented ring formed from a plurality of circumferentially spacers 24 mounted and supported to the disc 18 and each spacer extends between blades 14 and 16. Spacer segments may include a plurality of axially spaced pointed projections 25 that form a portion of the labyrinth seal that serve to seal in the hot gases typically used in these types of rotating machinery. The disk 18 includes a pair of axially spaced plurality of circumferentially spaced fir tree shaped slots 26 and 28. The spacers 24 include end flanges 30 and 32 that bear against the side wall of the disk adjacent the end of the slots 26 and 28 assuring that the blades are retained and do not inadvertently axially slide out of its respective slot. Flange 30 is configured with a plurality of recesses for accepting the dampers 34 and 36. Dampers 34 are of the well known type that serve to dampen vibrations that occur in the axial and circumferential directions and they do not form a part of this invention. This invention is particularly concerned with the problem of attenuating vibrations that occur in the radial directions and in particular to the solution that solved that problem which is the unique design and judicious inclusion of damper 36.

Figure 1:
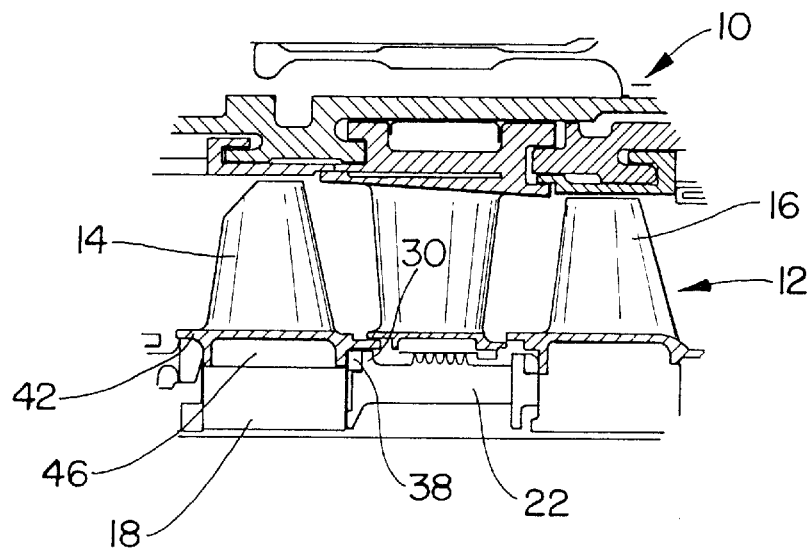
FIG. 1 is a partial view in elevation showing the two-stage turbine blades of a turbopump for a rocket engine.
Figure 3:
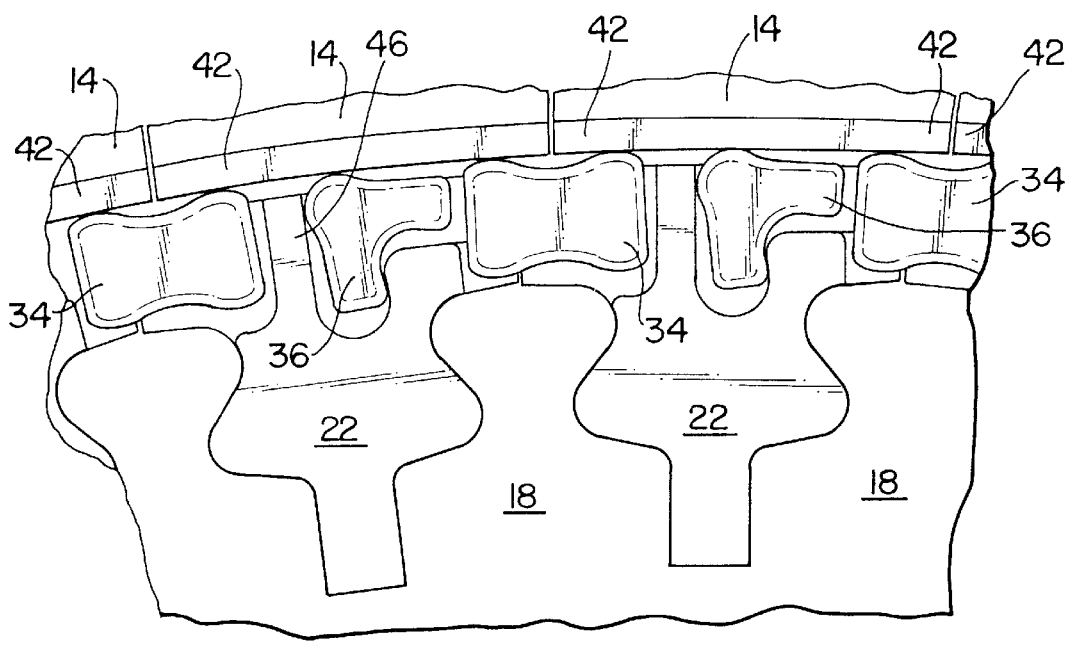
FIG. 3 is a sectional fragmentary view showing the damper of this invention mounted in the disk.
Figure 4:
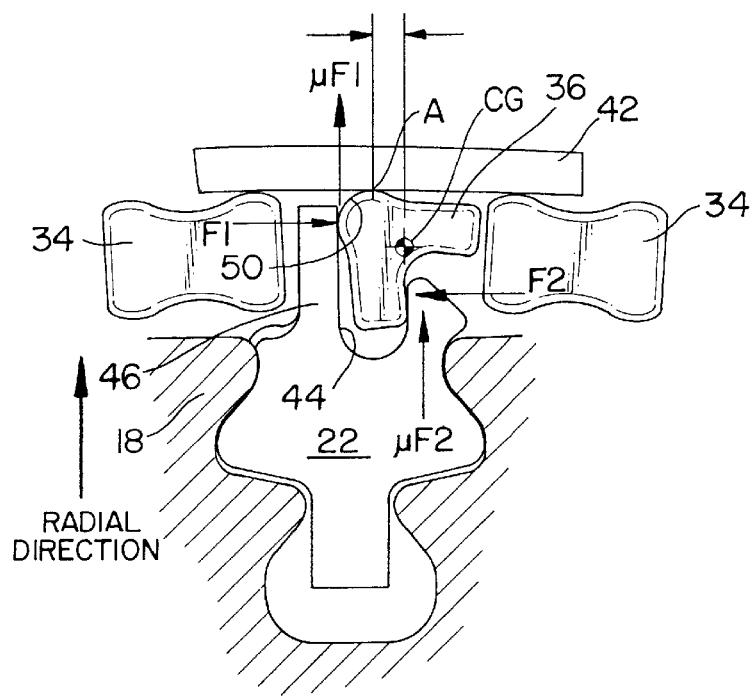
FIG. 4 is a partial view of FIG. 3 in schematic illustrating the forces acting on the damper, blade and disk.

As is apparent from viewing FIG. 1 the recess 38 formed in flange 30 is adjacent the root 40 and platform 42 of blades 14 and it will be noted that a portion of platform 42 extends and overlies recess 38. As will be described hereinbelow in more detail, damper 36 is located in this recess or pocket 38. Looking at FIG. 4 which is a partial view of FIG. 3 for depicting only one of the dampers 36. Like FIG. 3, FIG. 4 is a sectional view taken along lines 4—4 of FIG. 1 and shows that damper 36 fits into a radial slot 44 and underlies the platform 42 of blade 14 and under certain operating conditions bears against the underside of platform 42. It also bears against the leg 46 formed in radial slot 44 of interstage blade spacer 22. Damper 36 freely fits into slot 44 and is generally Y-shaped with a relatively bulbous surface 50 that bears against the underside of platform 42 and the side surface of leg 46 and against the side wall surface of the radial slot 44 formed in the interstage blade spacer 22. As seen in FIG. 4, during rotation of the turbine rotor, the damper 36, by virtue of the centrifugal load is urged upwardly to bear and press against the surfaces as shown therein.

Damper 36 is geometrically configured such that its center of gravity CG is offset from the point of contact A. The consequences of the radial forces acting on damper 36 represented by the reference letters $\mu F1$ and $\mu F2$ tend to cause it to rotate creating the forces indicated by reference letters F1 and F2. Leg 46 as shown, which may is installed in the radial slot 44 machined in the surrounding hardware. In this embodiment, the radial slot 44 may be made either fore or aft of the blade attachment so long as it underlies the platform 42 of blade 14. The rotation of damper 36 is restrained by leg 46 which results in a tangential load at the point of contact between the damper and slot. In order for blade 14 to move radially, the damper must slide while working against the friction produced from the tangential load. This frictional scrubbing during radial motion of the blade 14 converts much of the energy from the blades oscillatory motion into thermal energy which is removed by passing fluid which is typically used to keep the heated parts of the rotor that are exposed to the hot gaseous working medium of the turbo pump cooled. The conversion of this kinetic energy into thermal energy results in lower amplitudes of motion and subsequently lower cyclic stress in the turbine blade.

In actual experimental testing of this structure described herein, the fuel pump utilizing this invention eliminated the cracking of turbine blades and their ultimate failure that occurred without the use of the damper of this invention. This invention enhanced the durability of the rotating machinery as described and required a relatively inexpensive component that is easy to assemble and disassemble and requiring no additional parts to the overall turbo-pump configuration other than the damper.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. A damper for damping the radial vibrations incidental to the blades of a turbine rotor, said damper being a generally Y-shaped member, said turbine rotor including a disk, a plurality of circumerentially spaced blades supported in said disk, said damper being made from a single piece and freely mounted in a radial slot formed in proximity to said disk, said slot defining a wall surface, a portion of said generally Y-shaped member bearing against said at least one blade of said blades, and one leg of said Y-shaped member bearing against said wall surface of said radial slot, wherein said portion radially bears against said blade adjacent to said disk when said rotor is rotating, said Y-shaped member having a center of gravity at a location that is offset from where said portion bears against said blade, wherein the vibrations exciting said blade in the radial direction are transmitted through said damper to said disk for creating a friction between said one leg of said Y-shaped member and said disk for attenuating said vibrations.

2. A damper for damping the radial vibrations incidental to the blades of a turbine rotor as claimed in claim 1 wherein said blade includes a platform extending laterally from said blade, said portion of said Y-shaped member radially bearing against the undersurface of said platform.

3. A damper for damping the radial vibrations incidental to the blades of a turbine rotor as claimed in claim 2 wherein said damper is made from a metallic material.

4. A damper for damping the radial vibrations incidental to the blades of a turbine rotor as claimed in claim 3 including a blade spacer, said blade spacer disposed in a space defined between said platform and said disk, said blade spacer including a radially extending leg underlying but spaced from said platform, and said damper disposed in another slot formed in said blade spacer adjacent to said slot whereby said damper bears against said platform in a radial direction, against said radially extending leg in a tangential direction and wall surface of said slot in a tangential direction.

5. A damper for damping the radial vibrations incidental to the blades of a turbine rotor as claimed in claim 4 whereby said damper is free to rotate in said slot.

6. A damper in combination with a two-stage turbine, said two stage turbine including a disk, a first row of circumferentially spaced blades mounted in said disk, a second row of circumferentially spaced blades mounted in said disk and axially spaced from said first row of blades, a spacer mounted in said disk between said first row of blades and said second row of blades and providing a space adjacent said first row of blades and said disk, a platform on each of said blades and at least one platform in said first row of blades extending over said space, a leg extending from said spacer extending radially toward said platform but spaced therefrom, said damper freely disposed in a slot formed in said spacer adjacent said leg and underlying said platform, said damper being generally Y-shaped and having one portion thereof radially bearing against said platform when said disk is rotating, said slot defining a wall surface, the center of gravity of said damper being spaced from the junction where the portion of said Y-shaped member bears against said platform, a damper leg of said Y-shaped damper tangentially bearing against said wall surface in said slot wherein said damper tends to rotate when excited radially by vibrations encountered by said blades whereby said damper tends to rotate in said slot creating friction between said damper and the wall surface of said slot for dissipating the energy created by said vibrations.

7. A damper in combination with a two-stage turbine as claimed in claim 6 wherein another portion of said Y-shaped damper tangentially bears against said radially extending leg.

8. A damper in combination with a two-stage turbine as claimed in claim 7 including a second damper mounted in said spacer and also bearing against said platform and spaced circumferentially from said Y-shaped damper for dissipating the energy created by vibrations of said blades when occurring in the circumferential and axial directions.

9. A damper in combination with a two-stage turbine as claimed in claim 8 wherein said Y-shaped damper is made from a metallic material.

* * * * *